United States Patent [19]
Bergner et al.

[11] Patent Number: 5,522,519
[45] Date of Patent: Jun. 4, 1996

[54] SELF SUPPORTING PLASTIC BOTTLE WITH TEXTURED THIN WALLS

[75] Inventors: Rainer Bergner, Duesseldorf; Hubert Droessler, Erkrath; Peter Kittscher, Kaarst; Siegfried Konkel, Duesseldorf; Volker Weiss, Langenfeld; Paul-Otto Weltgen, Hilden, all of Germany

[73] Assignee: Henkel Kommanditgesellschaft auf Aktien, Duesseldorf, Germany

[21] Appl. No.: 284,499

[22] PCT Filed: Jan. 27, 1993

[86] PCT No.: PCT/EP93/00185

§ 371 Date: Aug. 4, 1994

§ 102(e) Date: Aug. 4, 1994

[87] PCT Pub. No.: WO93/15961

PCT Pub. Date: Aug. 19, 1993

[30] Foreign Application Priority Data

Feb. 5, 1992 [DE] Germany .......................... 42 03 209.1
Mar. 24, 1992 [DE] Germany .......................... 42 09 436.4

[51] Int. Cl.⁶ ................................................. B65D 23/00
[52] U.S. Cl. ............................................ 215/382; 220/675
[58] Field of Search ........................... 215/382; 220/669, 220/670, 675; 264/340

[56] References Cited

U.S. PATENT DOCUMENTS

| | | | |
|---|---|---|---|
| 2,971,671 | 2/1961 | Shakman | 220/609 X |
| 3,984,047 | 10/1976 | Clayton et al. | 220/403 X |
| 4,481,163 | 11/1984 | Ota et al. | 215/382 X |
| 4,535,902 | 8/1985 | Clark | 215/382 X |
| 5,100,017 | 3/1992 | Ishinabe et al. | 220/674 X |
| 5,226,551 | 7/1993 | Robbins, III | 220/8 |
| 5,242,085 | 9/1993 | Richter et al. | 215/382 X |

*Primary Examiner*—Allan N. Shoap
*Assistant Examiner*—Christopher J. McDonald
*Attorney, Agent, or Firm*—Szoke, Ernest G.; Wayne C. Jaeschke; Kenneth Watov

[57] ABSTRACT

A plastic bottle, made of polyethylene (PE), polypropylene (PP), or poly(ethylene terephthalate) (PET), blown with a very thin overall wall thickness within the range 0.1 to 0.3 mm, includes a triangular or polygonal cross-section, the bottle being preferably surrounded by a supporting jacket. The bottle can be blown with a uniform wall thickness and adequate strength without the need for reinforcing ribs via walls formed by pressing them against the surface of a blow mold which has been worked at least in some areas by etching, form-cutting or eroding, having features with heights of 0.05 to 0.15 mm.

3 Claims, 1 Drawing Sheet

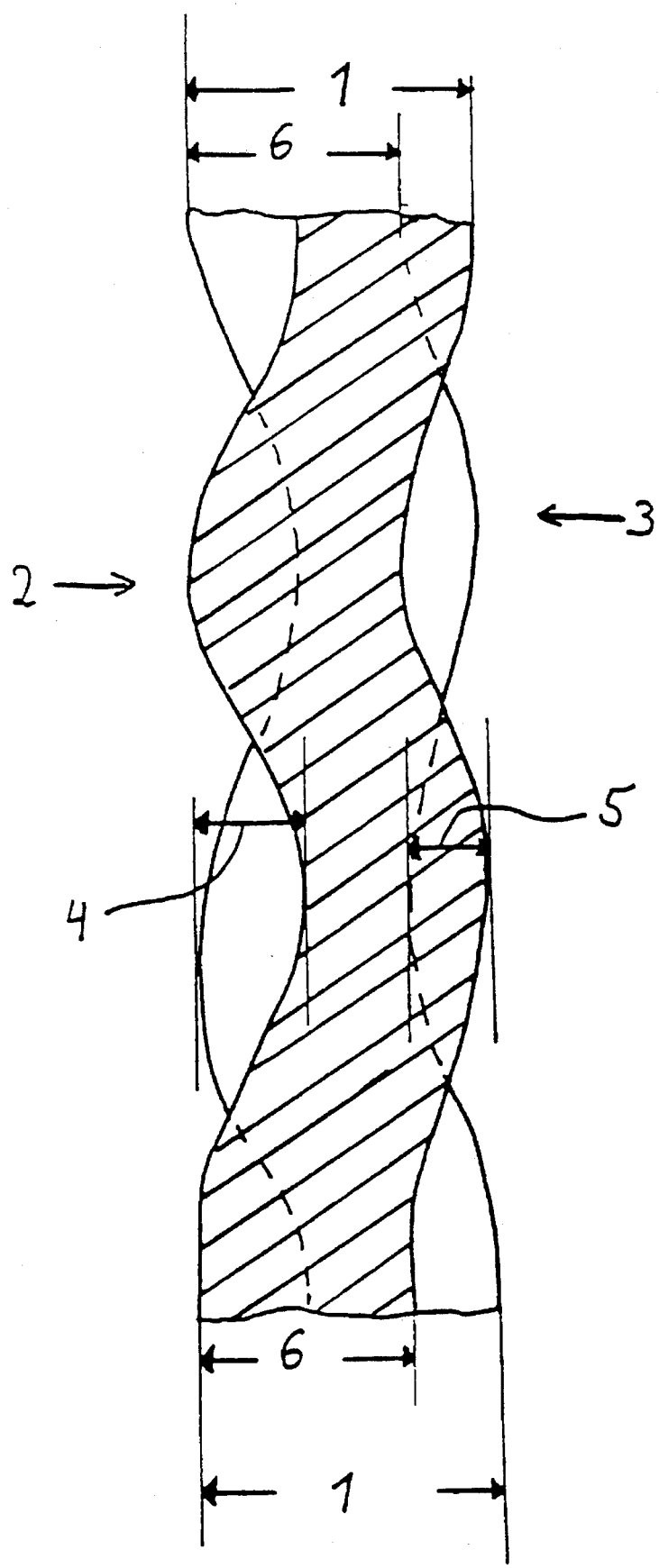

SELF SUPPORTING PLASTIC BOTTLE WITH TEXTURED THIN WALLS

BACKGROUND

1. Field of the Invention

This invention relates to a generally thin-walled, blow-molded plastic bottles, and more particularly to such bottles typically surrounded by a bottomless and topless supporting jacket of either polyethylene (PE), polypropylene (PP) or polyethylene terephthalate (PET) with a very thin overall wall thickness of 0.1 to 0.3 mm

2. Discussion of Related Art

Known processes for the production of plastic bottles in blow molds, so-called bottle blowing processes, are also suitable for the production of extremely thin-walled plastic bottles. Plastic bottles of polyethylene terephthalate (PET) are produced, for example, by initially injection-molding a parison and then blow-molding the parison under the effect of heat into the required bottle shape. Plastic bottles of polyethylene (PE) are produced, for example, by feeding a PE tube to the blow molds of bottle blowing machines and blow-molding the tube in the blow molds to form bottles. It is known that very thin-walled plastic bottles can be produced by these bottle blowing processes. These plastic bottles have a smooth surface texture. To increase the strength and stability of the bottles and to prevent them from bulging, particularly during and after filling with liquid, it is known (cf. EP-A-0 198 587) that the bottles can be provided with pronounced stabilizing and stiffening ribs and recesses. This requires particularly expensive and relatively complicated blow molds. The need for a uniform and constant wall thickness over the entire extent of the bottle wall is a problem which has not been satisfactorily solved in these known bottles.

Very thin-walled blow-molded plastic bottles of polyethylene (PE) with a wall thickness of 0.1 to 0.3 mm and a rectangular cross-section surrounded by a bottomless and topless supporting jacket of cardboard are known from DE-A-39 21 258 and have been on the market for some time. The need for a uniform and constant wall thickness over the entire extent of the bottle wall is again a problem which has not been satisfactorily solved in these bottles either. During blow molding in the blow molds, extremely thin zones well below the required wall thickness are formed in the 0.1 to 0.3 mm thick bottle wall; in some cases, holes are even formed in the bottle wall. Another disadvantage of these thin-walled plastic bottles is that the side walls show signs of buckling on removal from the blow mold and bulge out when filled with liquid or free-flowing product.

In addition, it is generally known that plastic bottles with standard wall thicknesses of 0.35 to 0.8 mm can be produced in blow molds toughened, for example, by etching or sandblasting if parts of the outer surface of the bottle are to have a matt or rough texture for reasons of optical design. However, this does not affect the stability or rigidity of the bottles on account of the relatively thick walls of the bottles to which this process has hitherto been applied.

SUMMARY OF THE INVENTION

An object of the invention is to provide a very thin-walled plastic bottle free from stiffening ribs which can be produced by blow molding, has a uniform wall thickness, and has sufficient strength to resist bulging.

In a plastic bottle of the invention, are at least the side bottle walls are formed by application to a blow molding surface at least locally prepared by etching, profile milling or erosion for texturing the wall to depths of 0.05 to 0.15 mm.

Blow-molded plastic bottles with a total wall thickness of 0.1 to 0.3 mm textured to depths of 0.05 to 0.15 mm in their walls are improved in their overall stability and, in particular, in their resistance to bulging by comparison with smooth-surface plastic bottles having the same wall thickness. It is sufficient in regard to improved resistance to bulging if only the side walls of the plastic bottle are textured in accordance with the invention. The texturing is achieved by preparing the corresponding surfaces of the blow mold, to which those parts of the plastic material to be textured are applied during blow molding of the plastic bottle, by etching, profile milling or erosion in such a way that the bottle is textured to depths of 0.05 to 0.15 mm in the applied parts of the bottle wall. It has been found in this regard that it is sufficient to prepare the blow molds in such a way that the prepared surfaces are textured to depths of 0.01 to 0.03 mm. In view of the very thin overall wall thicknesses of 0.1 to 0.3 mm, the texture is reproduced both on the outer surface and on the inner surface of the corresponding parts of the plastic bottle. In this way, the distance between the outer surface and the inner surface (overall wall thickness) in the textured parts of the bottle wall is increased by comparison with smooth-walled plastic bottles having the same wall thickness of 0.1 to 0.3 mm, without the actual wall thickness being increased or an increased amount of plastic material being used. Those parts of the bottle wall textured to depths of 0.05 to 0.15 mm show improved and increased stiffness in flexure. The thin-walled plastic bottles according to the invention with overall wall thicknesses of 0.1 to 0.3 mm locally textured to depths of 0.05 to 0.15 mm on their walls can be produced in bottle blowing machines designed for standard thick-walled plastic bottles. To produce the thin-walled plastic bottles, the blow molds used in the bottle blowing process have to be prepared by etching, profile milling or erosion, etching being understood to include photoetching, graining, structuring or texturing. The plastic bottles blow-molded in such blow molds have a constant and uniform wall thickness over the extent of their walls and high stability and strength despite their extremely low wall thickness and overall wall thickness values. Compared with the smooth thin-walled plastic bottles known from DE-A-39 21 258, they are distinctly improved in their stability and strength and are distinguished by uniform wall thickness over their walls. In corners in particular, there are no longer any thin zones with undesirably low wall thickness values. The plastic bottles thus produced show very high dimensional accuracy whereas untextured thin-walled bottles have a marked tendency to bulge, particularly over flat surfaces, such as the side walls. They undergo negligible, i.e. unproblematical, bulging during and after filling with liquid or free-flowing product. There is no longer any need for stiffening ribs and/or recesses. The production of thin-walled plastic bottles in correspondingly prepared blow molds also affords advantages for the bottle blowing process. It has been found that textured blow molds provide for better mold venting at the faces and mold parting lines, for better cooling and for a shorter cycle time in the actual bottle blowing process. In addition, it has been found that plastic bottles textured to depths of 0.05 to 0.15 mm in parts of their walls can be transported particularly effectively on the conveyor belts of filling machines when the bottom wall is also correspondingly textured. Compared with smooth-walled plastic bottles with the same wall thickness and hence equally light weight, the plastic bottle according to the invention is distinguished by distinctly better slip and transport behavior on conveyor belts of filling machines.

It is sufficient, particularly in the case of plastic bottles surrounded by a bottomless and topless supporting jacket, to texture only the side walls in order to achieve the abovementioned advantages and improvements over smooth-surface or smooth-walled light-weight plastic bottles. It is of advantage in the absence of a cardboard jacket to texture to depths of 0.05 to 0.15 mm those parts of the bottle wall which are formed by application to a blow molding surface prepared in its entirety by etching, profile milling or erosion.

It is also possible to produce various surface textures, which enable various parts of the bottle wall to be differently textured, by etching certain portions of the molding surfaces of the bottle blowing molds and sand-blasting other portions thereof. Basically, portions of the molding surfaces of the bottle blowing molds may be prepared by different texturing methods. The entire molding surface of a bottle blowing mold may thus be locally textured by application of one of the methods mentioned above. In other words, the roughness is produced by a combination of two or more of the methods mentioned above. The combination of various texturing methods also influences the strength of the plastic bottle produced. Thus, those parts of the bottle blowing mold which form the shoulder of the bottle may be sandblasted while those parts which form the body and base of the bottle may be etched.

Known bottle blowing machines and blow molds may be used for the production of the thin-walled blow-molded plastic bottles with an overall wall thickness of 0.1 to 0.3 mm, of which the walls are locally textured to depths of 0.05 to 0.15 mm. The molding surfaces of the bottle blowing molds are prepared by etching, profile milling, sand blasting and erosion. The bottles are then blown as in standard bottle blowing processes. For the plastic bottles according to the invention, the bottle blowing compound is used in a quantity of, for example, 24±1 g or less for a 1-liter PE bottle. Those parts of the bottle blowing molds to which the bottle compound is applied during blow molding to form the wall zones of the plastic bottle textured in accordance with the invention are prepared by etching, profile milling or erosion in such a way that, after the bottle compound has been blow-molded to form thin-walled plastic bottles with overall wall thicknesses of 0.1 to 0.3 mm, these zones of the plastic bottle have depths of 0.05 to 0.15 mm. The texture is so deep that it also appears on the inside of the bottle. The plastic bottles with walls textured in accordance with the invention may have any of the cross-sectional forms typical of standard blow-molded plastic bottles, i.e. they may have round, polygonal or similar cross-sections. It is preferred that the walls have a triangular or polygonal or trapezoidal cross-section where they are surrounded by a bottomless and topless supporting jacket.

BRIEF DESCRIPTION OF THE DRAWING

The invention is described in more detail in the following with reference to the accompanying drawing, which is a schematic section on an enlarged scale through part of the wall of a thin-walled blow-molded plastic bottle of polyethylene (PE).

DETAILED DESCRIPTION OF THE INVENTION

The plastic bottle is preferably surrounded by a bottomless and topless supporting jacket (not shown). The plastic bottle, including the wall detail shown in the drawing, has an overall wall thickness 1 of 0.1 to 0.3 mm. The wall is textured both on its outer surface 2 and on its inner surface 3. The texture formed on the outer surface 2 and on the inner surface 3 has depths 4, 5 of 0.05 to 0.15 mm. The texture is produced by application of the outer surface 2 to blow mold surfaces prepared by etching, profile milling or erosion during the blow molding of the plastic bottle. In this production process, the texture produced on the outer surface 2 of the wall by the prepared blow mold surfaces is also reproduced on the inner surface 3 of the wall, i.e. on the inside of the plastic bottle. Although this does not increase the actual wall thickness 6 of the plastic bottle, it does increase the wall thickness 1 relative to the actual wall thickness 6 because the distance between the outer surface 2 and the inner surface 3 is greater because of the texture.

Although various embodiments of the present invention have been shown and described herein, they are not meant to be limiting. Those of skill in the art may recognize certain modifications to these embodiments, which modifications are meant to be covered by the spirit and scope of the appended claims.

What is claimed is:

1. A thin-walled, blow-molded plastic bottle with a very thin overall wall thickness of 0.1 to 0.3 mm, and said bottle having a polygonal cross-section, wherein at least inner and outer side wall portions of said bottle are textured to have a roughened surface that is uneven to depths of 0.05 to 0.15 mm.

2. The blow-molded plastic bottle of claim 1, wherein said bottle consists of one of a family of plastics including polyethylene (PE), polypropylene (PP), and polyethylene terephthalate (PET).

3. The blow-molded plastic bottle of claim 1, wherein the side wall portions of said bottle are textured on both inner and outer surfaces thereof.

* * * * *